(12) United States Patent
Seder et al.

(10) Patent No.: US 11,947,315 B2
(45) Date of Patent: Apr. 2, 2024

(54) CONTRAST CHARACTERIZATION OF MULTI-PLANE HOLOGRAPHIC HUD ACCOUNTING FOR IMAGE ARTIFACTS

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 442 days.

(21) Appl. No.: 17/237,815

(22) Filed: Apr. 22, 2021

(65) Prior Publication Data
US 2022/0342367 A1 Oct. 27, 2022

(51) Int. Cl.
*G09G 5/02* (2006.01)
*B60K 35/00* (2006.01)
*G03H 1/22* (2006.01)
*G06F 3/01* (2006.01)
*G06T 7/521* (2017.01)
*G06T 7/90* (2017.01)

(52) U.S. Cl.
CPC .......... *G03H 1/2294* (2013.01); *B60K 35/00* (2013.01); *G03H 1/2249* (2013.01); *G06F 3/013* (2013.01); *G06T 7/521* (2017.01); *G06T 7/90* (2017.01); *B60K 2370/1529* (2019.05); *B60K 2370/29* (2019.05); *G03H 2001/2284* (2013.01); *G03H 2225/30* (2013.01)

(58) Field of Classification Search
CPC .... G09G 5/02; G09G 5/06; G09G 2320/0666; G09G 2340/06; G09T 11/001
USPC ........................................................ 345/589
See application file for complete search history.

(56) References Cited

U.S. PATENT DOCUMENTS

| | | | |
|---|---|---|---|
| 10,319,116 B1 * | 6/2019 | C ............................ | G09G 5/377 |
| 10,891,890 B1 * | 1/2021 | Choi ....................... | G09G 3/006 |
| 2011/0157667 A1 * | 6/2011 | Lacoste ................ | G03H 1/0808 |
| | | | 359/9 |
| 2011/0299034 A1 * | 12/2011 | Walsh .................... | A61B 3/132 |
| | | | 351/206 |
| 2019/0213932 A1 * | 7/2019 | Yoneyama ............. | B60Q 9/008 |

* cited by examiner

*Primary Examiner* — Gordon G Liu (57) ABSTRACT

A holographic projection system includes a SLM that receives a light beam and generates a modulated beam projected at an eyebox, where: the modulated beam includes multiple versions of a test image; and the test image includes bright objects and transparent regions, which are selected dark areas of interest for measuring luminance. A control module runs a test to characterize contrast in each of multiple virtual image planes including: controlling the SLM to generate the modulated beam; measuring luminance levels of each of the versions of the test image displayed in the virtual image planes; calculating contrast ratios based on the luminance levels of each of the versions of the test image; determining whether the contrast ratios are within predetermined ranges of predetermined contrast ratios; and adjusting operation of the SLM in response to one of the contrast ratios not being within a corresponding one of the predetermined ranges.

20 Claims, 6 Drawing Sheets

CONTRAST CHARACTERIZATION OF MULTI-PLANE HOLOGRAPHIC HUD ACCOUNTING FOR IMAGE ARTIFACTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to holographic projection systems and head-up displays of vehicles.

Display devices are used in a variety of applications. Some example display devices are flat panel displays, projection displays, and head-up displays. Display devices can either be of a transmission or reflection type.

A driver of a vehicle traditionally views surroundings of a vehicle through windows, windshields, and other glass of the vehicle. The driver may control vehicle acceleration, deceleration, and steering based on the driver's visual observation of the surroundings of the vehicle. The vehicle may include one or more displays that display various information to the driver. For example, some vehicles include an infotainment system that includes a display that displays various infotainment and other vehicle information. The vehicle may also include a head-up display (HUD) that displays information by forming a virtual image at a certain distance with reflection of a windshield. For example, the HUD may display a vehicle speed and other vehicle information (e.g., warnings such as lane departure warnings and collision avoidance warnings).

SUMMARY

A holographic projection system is provided and includes a light source, a spatial light modulator, and a control module. The light source is configured to generate a light beam. The spatial light modulator is configured to receive the light beam and generate a modulated beam projected at an eyebox, where the modulated beam includes multiple versions of a test image, where the test image includes bright objects and transparent regions, and where the transparent regions are selected dark areas of interest for measuring luminance. The control module is configured to run a test to characterize contrast in each of multiple virtual image planes of a head-up display including: controlling the spatial light modulator to generate the modulated beam; measuring luminance levels of each of the versions of the test image displayed in the virtual image planes; calculating contrast ratios based on the luminance levels of each of the versions of the test image; determining whether the contrast ratios are within predetermined ranges of predetermined contrast ratios; and adjusting operation of the spatial light modulator in response to at least one of the contrast ratios not being within a corresponding one of the predetermined ranges.

In other features, the versions of the test image include: a first version of the test image displayed in a first virtual image plane; and a second version of the test image displayed in a second virtual image plane located closer to the eyebox than the first virtual image plane.

In other features, the bright objects are not black in color.

In other features, the bright objects include a first bright object. The transparent regions are located around the first bright object.

In other features, the bright objects include a first bright object. The transparent regions include a first transparent region and a second transparent region. The first transparent regions is located above the first bright object. The second transparent region is located below the first bright object.

In other features, measuring the luminance levels of the versions of the test image and calculating the contrast ratios include: measuring luminance levels of a first version of the test image displayed in a first virtual image plane including luminance levels of bright objects in the first version of the test image and luminance levels of selected transparent regions of the first version of the test image; calculating a first contrast ratio based on the luminance levels of the first version of the test image; measuring luminance levels of a second version of the test image displayed in a second virtual image plane including luminance levels of bright objects in the second version of the test image and luminance levels of selected transparent regions of the second version of the test image; and calculating a second contrast ratio based on the luminance levels of the second version of the test image.

In other features, the first contrast ratio is determined based on (i) a sum of luminance levels of bright objects displayed in the first version of the test image, (ii) a sum of luminance level of selected transparent regions of the first version of the test image, (iii) a number of the bright objects displayed in the first version of the test image, and (iv) a number of the selected transparent regions of the first version of the test image. The second contrast ratio is determined based on (i) a sum of luminance levels of bright objects displayed in the second version of the test image, (ii) a sum of luminance level of selected transparent regions of the second version of the test image, (iii) a number of the bright objects displayed in the second version of the test image, and (iv) a number of the selected transparent regions of the second version of the test image.

In other features, the control module is configured to, while adjusting the operation of the spatial light modulator, adjust modulation of the spatial light modulator to be less than or equal to one wave modulation and within a predetermined range of one wave modulation.

In other features, the control module is configured to, while adjusting the operation of the spatial light modulator, calibrating the spatial light modulator to lower intensity levels of a conjugate image displayed in one of the virtual image planes.

In other features, the control module is configured to at least one of identify or select locations of the transparent regions relative to locations of bright objects displayed in the test image.

In other features, a vehicle system is provided and includes the holographic projection system and a window of a vehicle. The holographic projection system is configured to reflect the versions of the test image off the window to be viewable at the eyebox.

In other features, a method of testing and correcting operation of a holographic projection system is provided. The method includes: generating a light beam via a light source; receiving the light beam at a spatial light modulator and generating a modulated beam projected at an eyebox, where the modulated beam includes versions of a test image, where the test image includes bright objects and transparent regions, and where the transparent regions are selected dark areas of interest for measuring luminance; and running a test to characterize contrast in each of multiple virtual image planes of a head-up display. The running of the test includes: controlling the spatial light modulator to generate the modulated beam; measuring luminance levels of each of the versions of the test image displayed in the virtual image planes; calculating contrast ratios based on the luminance levels of each of the versions of the test image; determining whether the contrast ratios are within predetermined ranges of predetermined contrast ratios; and adjusting operation of the spatial light modulator in response to at least one of the contrast ratios not being within a corresponding one of the predetermined ranges.

In other features, the versions of the test image includes: a first version of the test image displayed in a first virtual image plane; and a second version of the test image displayed in a second virtual image plane located closer to the eyebox than the first virtual image plane.

In other features, the number of the transparent regions is different than the number of bright objects.

In other features, the bright objects include a first bright object. The transparent regions are located around the first bright object.

In other features, the bright objects include a first bright object. The transparent regions include a first transparent regions and a second transparent regions. The first transparent region is displayed above the first bright object. The second transparent region is displayed below the first bright object.

In other features, measuring the luminance levels of the versions of the test image and calculating the contrast ratios include: measuring luminance levels of a first version of the test image displayed in a first virtual image plane; calculating a first contrast ratio based on the luminance levels of the first version of the test image; measuring luminance levels of a second version of the test image displayed in a second virtual image plane; and calculating a second contrast ratio based on the luminance levels of the second version of the test image.

In other features, the method further includes: determining the first contrast ratio based on (i) a sum of luminance levels of bright objects displayed in the first version of the test image, (ii) a sum of luminance level of transparent regions of the first version of the test image, (iii) a number of the bright objects displayed in the first version of the test image, and (iv) a number of the transparent regions of the first version of the test image; and determining the second contrast ratio based on (i) a sum of luminance levels of bright objects displayed in the second version of the test image, (ii) a sum of luminance level of transparent regions of the second version of the test image, (iii) a number of the bright objects displayed in the second version of the test image, and (iv) a number of the transparent regions of the second version of the test image.

In other features, the method further includes, while adjusting the operation of the spatial light modulator, adjusting modulation of the spatial light modulator to be less than or equal to one wave modulation and within a predetermined range of one wave modulation.

In other features, the method further includes, while adjusting the operation of the spatial light modulator, calibrating the spatial light modulator to lower intensity levels of a conjugate image displayed in one of the virtual image planes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
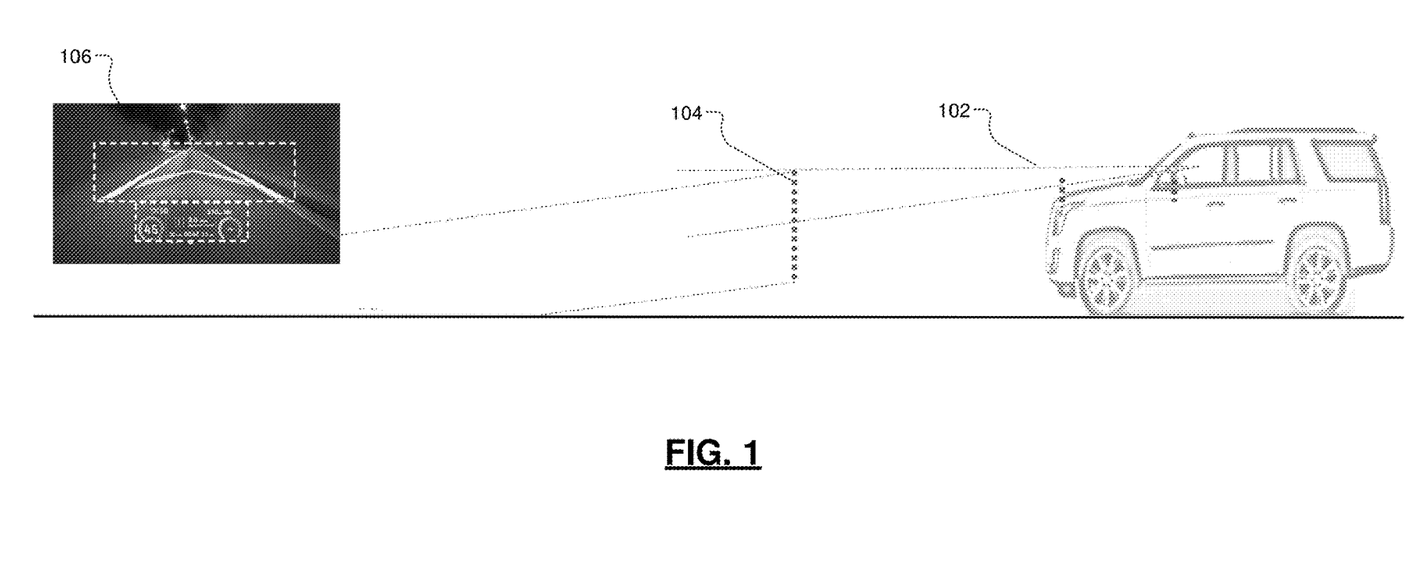
FIG. 1 is a virtual image plane diagram illustrating near and far virtual image planes of a holographic head up display (HUD)

A holographic HUD can be used to display images at multiple different virtual image planes. For example, a near virtual image plane may be used to display vehicle information, such as vehicle speed, radio stations, indoor and/or outdoor temperatures, warning indications, etc. A far virtual image plane may be used to display various other information for augmented reality purposes. For example, the holographic HUD may be used to display advertisements, information regarding objects in a surrounding environment, etc. FIG. 1 shows an example vehicle 100 including a holographic HUD that displays images in a near virtual image plane and in a far virtual image plane. The near virtual image plane is represented by dashed line 102 and the far virtual image plane is represented by dashed line 104. The near virtual image plane may be 2.3-2.5 meters forward of an eyebox (or eyes) of a vehicle driver. The far virtual image plane may be 7 or more meters forward of the eyebox.

An example view 106 of an area forward of the vehicle 100 is shown. Dashed box 110 refers to a far image displayed in a far virtual image plane and over the environment to provide an enhanced view (or augmented reality). In the example shown, lane markers and a direction indicator are displayed on the road ahead. Dashed box 112 refers to a near image displayed in a near virtual image plane and over the environment to provide vehicle information.

Figure 2:
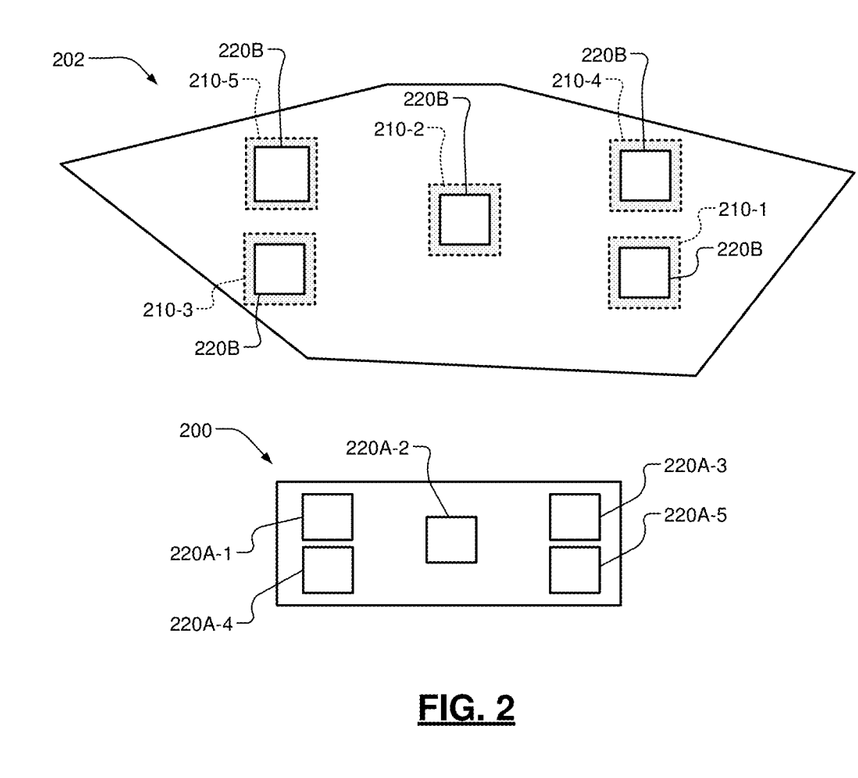
FIG. 2 is a view of near and far test images for a holographic projection system of a HUD illustrating "halo" regions due to cross-talk between images.

A holographic HUD can have different image artifacts. FIG. 2 shows a near test image 200 and far test image 202 for a holographic projection system of a HUD. The near test image 200 may cross-contaminate the far test image 202, which may result in "halo" regions 210 being shown in the far test image 202.

The near test image and the far test image may concurrently display five white boxes, designated 220A in the near test image and 220B in the far test image. The halo regions 210 may refer to hazy or different colored regions around, for example, the white displayed boxes 220B. The halo regions 210 (or "halos") may originate from a conjugate of the near test image 200 and may have directionality. The halo regions are in effect flipped upside down vertically and inverted left-to-right relative to the white boxes 220A and shown in the far test image. As a result, halos associated with bottommost boxes are shown high in the far test image, halos associated with uppermost boxes are shown low in the far test image, halos associated with leftmost boxes are shown near a right side of the far test image, and rightmost boxes are shown near a left side of the far test image. The locations are indicated by the last numbers of the numerical designators of the boxes 220A and the halos 210. For example, the halo 210-1 in the far test image corresponds to the white box 220A-1 in the near test image. The halo 210-2 in the far test image corresponds to the white box 220A-2 in the near test image. The halo 210-3 in the far test image corresponds to the white box 220A-3 in the near test image. The halo 210-4 in the far test image corresponds to the white box 220A-4 in the near test image. The halo 210-5 in the far test image corresponds to the white box 220A-5 in the near test image.

Holographic HUDs can have certain contrast ratio requirements for black and white regions displayed during testing of the holographic HUDs. A holographic HUD has different image artifacts than traditional HUDs. In order to satisfy the contrast ratio requirements for holographic HUDs, image artifacts need to be accounted for and minimized and/or eliminated.

One example characterization process, for a non-holographic display having only a single virtual image plane, includes luminance characterization of the virtual image plane. The characterization process does not account for (i) a visual artifact originated from a conjugate image, and/or (ii) cross-talk induced by the conjugate image in different virtual image planes. The characterization performed for the non-holographic display does not consider an anisotropic visual artifact that can appear in a holographic display.

Another characterization process includes luminance characterization of white and black displayed boxes, where a black box is displayed horizontally adjacent each white box. This approach has limited characterization and captures horizontal portions of halos, but does not capture vertical portions of halos.

The examples set forth herein includes a holographic HUD system that performs a characterization process. The holographic HUD system displays multiple (i.e. two or more) virtual image planes. The characterization process includes: concurrently displaying a same test image on near and far virtual image planes while calculating a contrast ratio of the test image in a single (or far) virtual image plane including measuring luminance in white (or bright) and black (or dark) regions; concurrently displaying the test image again in the near and far virtual image planes while calculating a contrast ratio of the test image in another single (or near) virtual image plane; comparing the contrast ratios to predetermined contrast ratios; and, based on the comparisons, recalibrating and/or adjusting operation of a spatial light modulator (SLM) such that the contrast ratios match and/or are within predetermined ranges of the predetermined contrast ratios. The disclosed characterization process captures image artifacts that are specific to multi-plane holographic HUDs.

Figure 3:
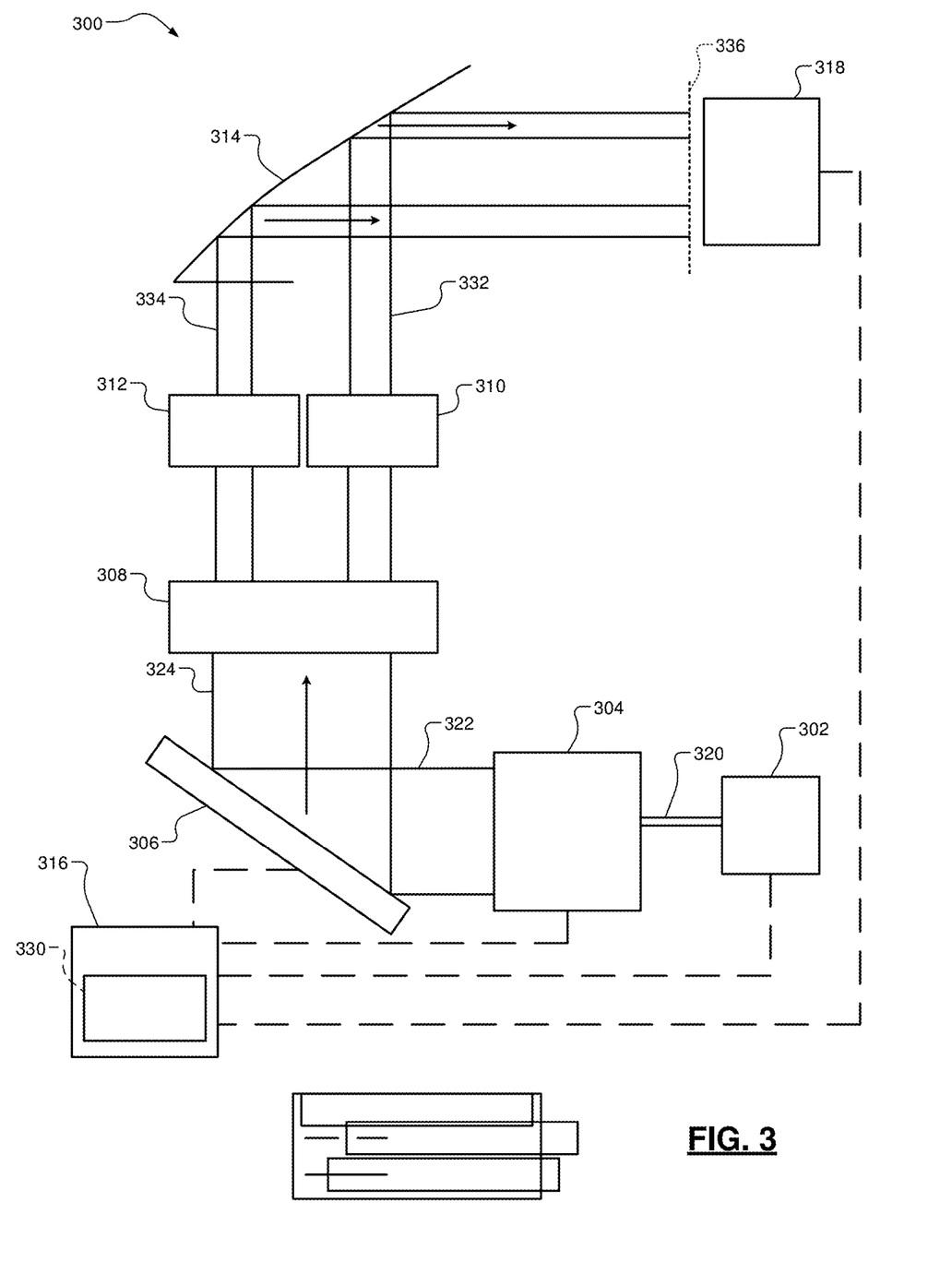
FIG. 3 is a functional block diagram of an example holographic projection system under test in accordance with the present disclosure.

FIG. 3 shows a holographic projection system 300 under test. The holographic projection system 300 may include one or more light (or laser) sources 302, a beam expander 304, a spatial light modulator (SLM) 306, a diffuser 308, first magnification optics 310, second magnification optics 312, a windshield (or reflector) 314, a control module 316 and a colorimeter 318. The light sources 302 generate a light beam 320, which is received at the beam expander 304. The beam expander 304 expands a width of the light beam 320 to provide an expanded beam 322. The SLM 306 receives the expanded beam 322 and is encoded with one or more graphic holograms via the control module 316 and provides a modulated beam 324 including multiple images. Each image may be a test image including respective bright objects (e.g., white boxes or boxes of another color) and selected transparent regions (or dark regions), as further described below. Cross-contamination of images can occur at the diffuser. In one embodiment, two versions of the same test image are output from the SLM 306 to the diffuser 308. In one embodiment, the beam expander 304 is not included and the output of the light sources 302 is received at the SLM 306. The control module 316 may include one or more display drivers 330 for controlling states of the SLM 306.

The output of the SLM 306 is received at the diffuser 308. Two optical paths are provided at the output of the diffuser 308. Two images (e.g., a far image and a near image) are received and projected from the diffuser 308 via the respective optical paths to the windshield 314. During normal use of the holographic projection system 300, the two images are different images with different information. During testing, the two images may include the same test image. The diffuser 308 receives the images including a first (or far) image that is provided to a first optical path and a second (or near) image that is provided to a second optical path. The optical paths respectively include the first magnification optics 310 and the second magnification optics 312. The magnification optics 310, 312 may include respective mirrors with respective curvatures, lenses, and/or other optical components. The first and second images are provided in respective projected beams 332, 334 to an eyebox. The projected beams 332, 334 are reflected off the windshield 314 and projected to the eyebox. A front of the eyebox is designated by focal plane 336. The eyebox refers to an area in which one or more eyes of a person would be located if the holographic projection system 300 were in use. If not under test and being used by the person, the projected beams 332, 334 are seen by one or more retinas of the one or more eyes of the person.

The colorimeter 318 receives the projected beams 332, 334 and detects luminance levels of each of the images of the projected beams 332, 334. The luminance levels and/or corresponding information may be indicative of and/or include luminance levels of objects and/or regions included in the displayed images. For example, the luminance levels may be of the white and black boxes displayed in each of the images projected from the magnification optics 310, 312 to the eyebox. The collected information is provided to the control module 316, which determines and/or stores the luminance levels of the different regions within each of the images and, based on the luminance levels, determines contrast ratios of the images.

Figure 4:
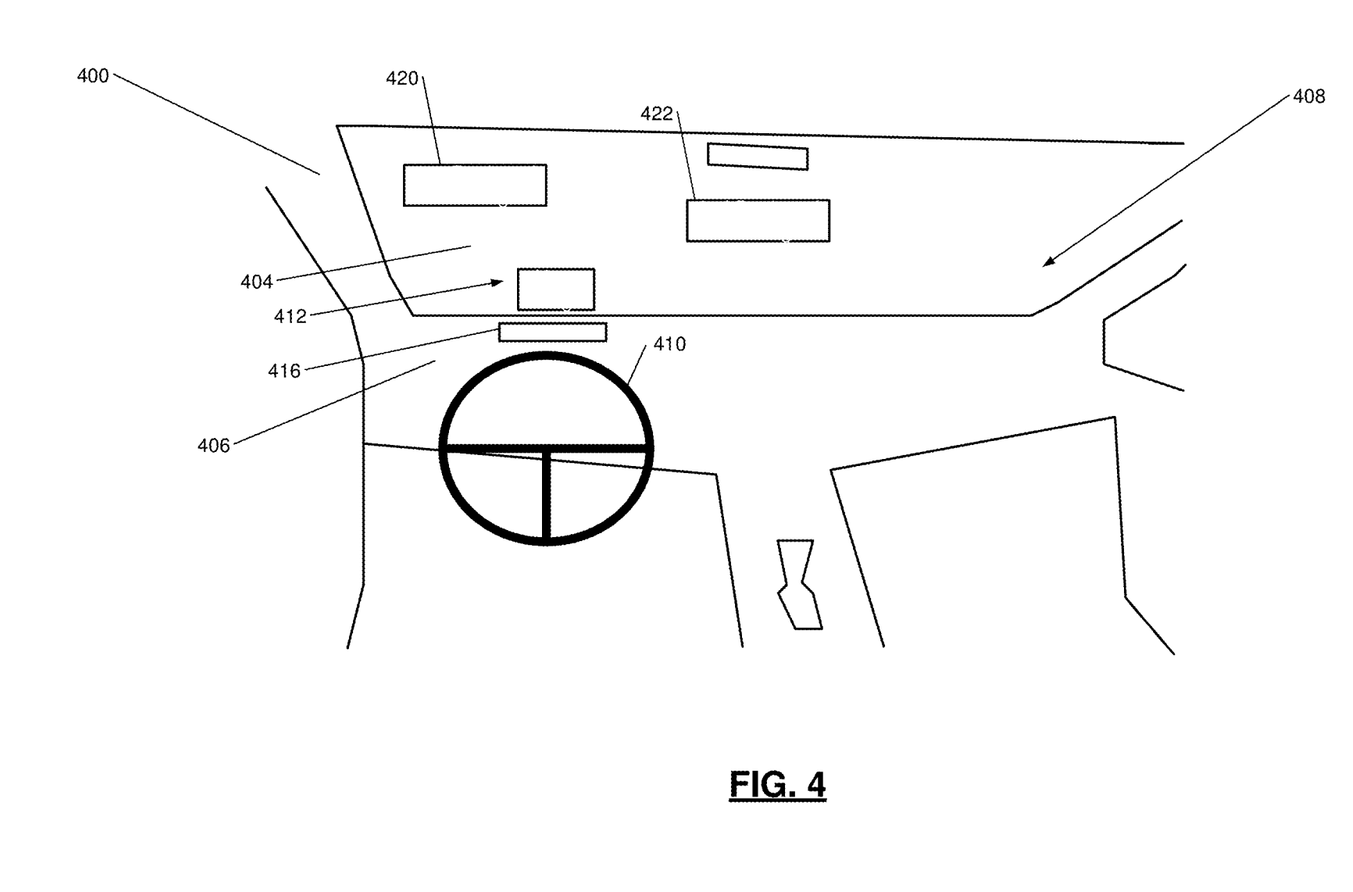
FIG. 4 is a perspective view of an example interior of a vehicle including the holographic projection system of FIG. 3.

FIG. 4 shows an example perspective view from a driver seat of a vehicle 400. The vehicle 400 includes a windshield 404 located in a front opening of the vehicle 400. Passengers within a passenger cabin 408 of the vehicle 400 can look through the windshield 404 to see in front of the vehicle 400. While the example of a land-based vehicle is described, the present application is also applicable to air-based vehicles (e.g., airplanes, helicopters, etc.) and water-based vehicles (e.g., boats, etc.). Also, although some examples are disclosed herein with respect to vehicle implementations, the examples are applicable to non-vehicle implementations.

As shown in FIG. 4, the windshield 404 is visually located above a dashboard 406 of the vehicle 400. The vehicle 400 may include a steering wheel 410. The vehicle 400 may be an autonomous vehicle, a semi-autonomous vehicle, or a non-autonomous vehicle.

A HUD including a holographic projection system, such as that described above with respect to FIG. 3, projects a near image (or first near hologram) 412 onto a portion of the windshield 404 through an aperture 416 in the dashboard 406. The near image is shown in a near virtual image plane, such as that shown in FIG. 1. When the vehicle is in use, the near image 412 includes various vehicle information, such as a present speed of the vehicle 400, a present gear of a transmission of the vehicle 400, an engine speed, a directional heading of the vehicle 400, present infotainment system settings, and/or other vehicle information. The near image 412 presents data to the driver of the vehicle without the driver having to look away from objects in front of the vehicle. The HUD also projects a far image, which may include a first portion 420 and a second portion 422 as shown. The far image is displayed in a far virtual image plane, such as shown in FIG. 1. The portions 420, 422 and/or other portions may include various information, indicators, markings, etc. to provide an augmented reality and enhance the driving experience.

During testing of the HUD, the near image and the far image may include bright and dark objects and/or regions, as described above. The luminance levels of each of the objects and/or regions may be detected by a colorimeter, such as that shown in FIG. 3.

Figure 5:
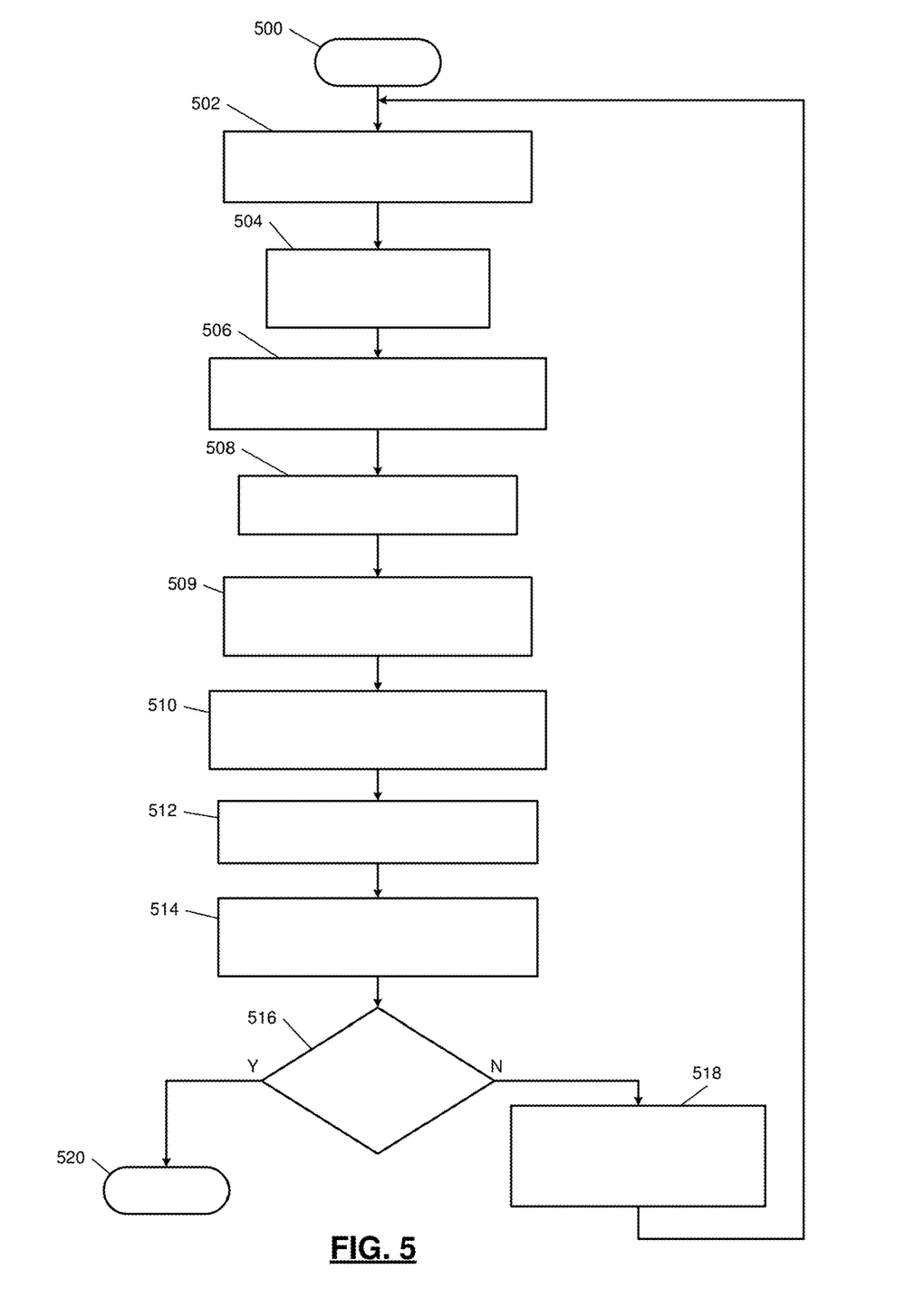
FIG. 5 illustrates a method of testing and correcting operation of a holographic projection system including multi-plane image contrast characterization in accordance with the present disclosure.

FIG. 5 shows a method of testing and correcting operation of a holographic projection system including multi-plane image contrast characterization. Although the following operations are primarily described with respect to the implementation of FIG. 3, the operations may be easily modified to apply to other implementations of the present disclosure. The operations of the method may be iteratively performed.

The method may begin at 500. At 502, the control module 316 selects locations of bright objects (or regions) as part of a test image and transparent areas (or dark regions) of the test image. The bright objects are displayed, whereas the transparent areas are predetermined areas of interest selected for measuring luminance levels in dark areas of interest. The HUD does not generate dark (or black) graphics since the display is fully transparent. The test graphic includes a selected number of bright objects and/or regions and has dark areas. Selected portions of the darks areas are selected for dark luminance level detection.

Figure 6:
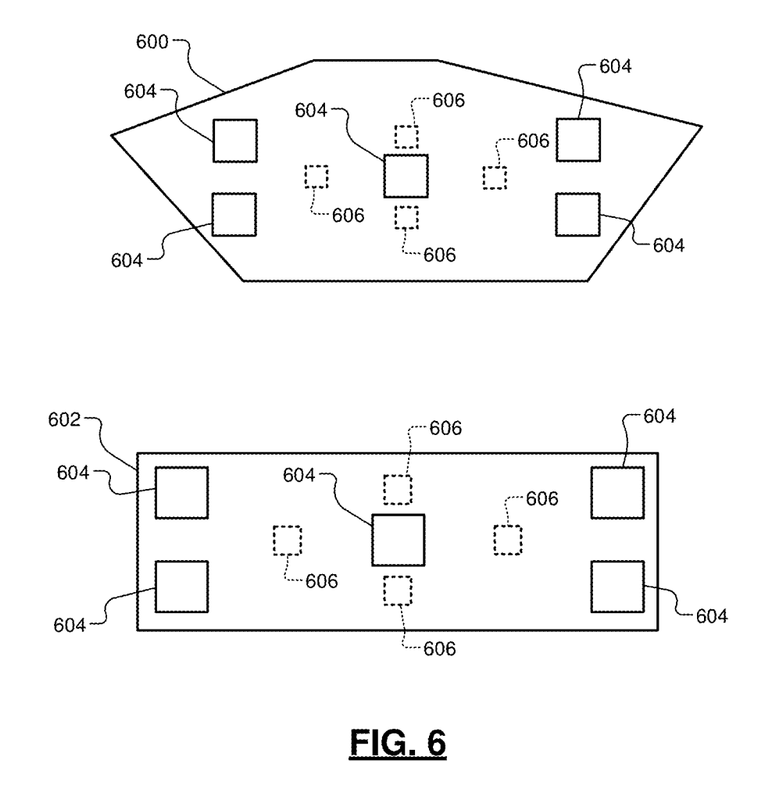
FIG. 6 is a view of near and far test images for the HUD illustrating white and black preselected regions displayed as part of the test images in accordance with the present disclosure.

As an example, FIG. 6 shows near and far test images 600, 602 for the HUD illustrating white preselected regions (or boxes) 604 and dark preselected regions (or boxes) 606 displayed as part of the test images 600, 602. In one embodiment, all or most of the test images 600, 602 other than the displayed bright objects are transparent and when shown in a dark room are dark. In one embodiment, the same test image is displayed in the near and far virtual image planes. Each displayed version of the test image includes the same number of bright preselected regions and dark preselected regions. Although the bright and dark regions are shown as boxes having particular sizes, the objects may have different shapes and/or sizes than shown. The shown white boxes 604 may be replaced with other colored boxes and/or other colored objects. The displayed bright objects may be colors other than white. The bright objects are not black in color. Dark regions are selected in vertical alignment with at least one of the bright objects and on opposite sides (e.g., top and bottom sides) of the at least one of the bright objects to capture vertical halos in upcoming calculations. The locations and number of the dark regions may be determined based on the locations and numbers of the bright objects. The locations of the bright objects may be determined based on size of screen (or window) on which the test image is displayed, orientation of the window (or windshield), interior or exterior luminance levels, types and/or luminance levels of other objects visible through and/or reflected off the window, etc.

In one embodiment, five bright objects are shown and four transparent (or dark) regions are selected, although a different number of bright objects may be shown and a different number of transparent (or dark) regions may be selected. In an embodiment, (i) one of the bright objects is in a center of each of the images 600, 602, (ii) the other four bright objects are in respective corners of the near image 602 and are similarly placed in the far image, and (iii) the four transparent regions are next to respective sides of the centrally shown bright object, such that a first transparent region is located above the centrally shown bright object, a second transparent region is located below the centrally shown bright object, a third transparent region is located horizontally aligned with and spaced away from a left side of the centrally shown bright object, and a fourth transparent region is located horizontally aligned with a spaced away from the right side of the centrally shown bright object. The first transparent region is in a region on an opposite side of the centrally shown bright object than a region in which the second transparent region is located. The third transparent region is in a region on an opposite side of the centrally shown bright object than a region in which the fourth transparent region is located. The four bright objects that are not centrally located are located further from the centrally shown bright object than the four transparent regions.

At 504, the control module 316 controls the SLM 306 to concurrently and/or simultaneously display a same test image on multiple image planes, such as near and far virtual image planes to provide far and near images. In an embodiment, multiple versions of the test image are displayed over a black (dark room) background. Although this method is primarily described with respect to two virtual image planes, the same and/or similar operations may be performed when a test image is displayed on more than two virtual image planes.

At 506, measure luminance levels of far image via imaging colorimeter 318 focusing at a first (e.g., far) virtual image plane. In an embodiment, the measurements are taken in a dark room. At 508, the control module 316 calculates a first contrast ratio of the first virtual image plane including measuring luminance in white (or bright) and black (or dark) regions of the far image in the first virtual image plane. The first contrast ratio may be calculated using, for example, equation 1, where $k_B$ is a dark adjustment constant, $k_W$ is a bright adjustment constant, FW is luminance of bright object i in far test image, FB is luminance of dark region i of far test image. In one embodiment $k_B$ is the total number of dark regions of the test image and $k_W$ is the total number of bright objects in the test image.

$$CR(\text{far}) = \frac{k_B \sum_{i=1}^{k_W} FW_i}{k_W \sum_{i=1}^{k_B} FB_i} \quad (1)$$

The luminance levels of the bright objects, in the locations of interest of the far test image, are summed to provide a collective white luminance value associated with the far virtual image plane. The luminance levels of the dark regions, at the locations of interest of the far test image, are summed to provide a collective dark luminance value associated with the far virtual image plane. A simultaneous contrast ratio is provided by dividing the collective white luminance value by the collective dark luminance value. The ratio is multiplied by an adjustment parameter, which in equation 1 is $$\frac{k_B}{k_W},$$

which may be a ratio of the total number of dark regions relative to the total number of bright objects.

At 509, the same test image is re-displayed or continued to be displayed in the far and near virtual image planes. In an embodiment, multiple versions of the test image are displayed over a black (dark room) background.

At 510, measure luminance levels of near image via imaging colorimeter 318 focusing at a second (e.g., near) virtual image plane. In an embodiment, the measurements are taken in a dark room. At 512, the control module 316 calculates a second contrast ratio of the test image in the second virtual image plane including measuring luminance in white (or bright) and black (or dark) regions of the near image in the second virtual image plane. The second contrast ratio may be calculated using, for example, equation 2, where NW is luminance of bright object i in the near test image and NB is luminance of dark region i of the near test image.

$$CR(\text{near}) = \frac{k_B \sum_{i=1}^{k_W} NW_i}{k_W \sum_{i=1}^{k_B} NB_i} \quad (2)$$

The luminance levels of the bright objects, in the locations of interest of the near test image, are summed to provide a collective white luminance value associated with the near virtual image plane. The luminance levels of the dark regions, at the locations of interest of the near test image, are summed to provide a collective dark luminance value associated with the near virtual image plane. A simultaneous contrast ratio is provided by dividing the collective white luminance value by the collective dark luminance value. The ratio is multiplied by an adjustment parameter, which in equation 2 is $$\frac{k_B}{k_W},$$

which may be a ratio of the total number of dark regions relative to the total number of bright objects.

At 514, the control module 316 compares the first and second contrast ratios to respective predetermined and/or target contrast ratio ranges and/or values. The contrast ratios provide simultaneous contrast characterization capturing effects of cross-contamination and/or image artifacts between near and far virtual image planes. The predetermined contrast ratios may be baseline ratios for test images experiencing no cross-contamination. The predetermined contrast ratios may correspond to test images displayed when modulation of the SLM 306 is one wave modulation.

At 516, the control module 316 may be determined if the calculated contrast ratios are within predetermined ranges of the predetermined contrast ratio values. If one or more of the calculated contrast ratios are not within the corresponding predetermined ranges (e.g., 5%) of the predetermined contrast ratio values and/or do not match the corresponding one or more predetermined contrast ratios, the control module 316, at 518, may troubleshoot the holographic projection system 300, calibrate the SLM 306, adjust modulation of the SLM 306, and/or perform other operations to correct the contrast ratios. The SLM 306 may be recalibrated and/or adjusted such that the contrast ratios match and/or are within the predetermined ranges of the predetermined contrast ratios. If the calculated contrast ratios are within the corresponding predetermined ranges (e.g., 5%) of the predetermined contrast ratio values and/or do match the corresponding predetermined contrast ratios, then the method may end at 520.

In one embodiment, the SLM 306 is calibrated to lower intensity levels of a conjugate image displayed in one of the virtual image planes (e.g., the far virtual image plane) as a result of cross-contamination from another one of the virtual image planes (e.g., the near virtual image plane). In another embodiment, modulation of the SLM 306 is adjusted to have between zero and one wave modulation. In another embodiment, the modulation of the SLM 306 is adjusted to be less than or equal to one wave modulation and within a predetermined range of one wave modulation (e.g., 0.95-1.0 wave modulation). In another embodiment, modulation of the SLM 306 is adjusted to have one wave modulation.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples provide simultaneous contrast characterization for each virtual image plane of a holographic HUD that concurrently displays multiple virtual image planes. A contrast ratio value is provided for each virtual image plane. The contrast ratio provides is simultaneously indicative of the luminance of bright regions relative to dark regions. Contrast ratio values are provided for each virtual image plane. By (i) properly defining locations of dark regions of interest for luminance measurement, (ii) displaying test images concurrently in the virtual image planes, and (iii) characterizing one of the virtual image planes at a time, specific visual artifacts are captured.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A holographic projection system comprising:
a light source configured to generate a light beam;
a spatial light modulator configured to receive the light beam and generate a modulated beam projected at an eyebox, wherein the modulated beam comprises a plurality of versions of a same test image, wherein the test image comprises a plurality of bright objects and a plurality of transparent regions, and wherein the plurality of transparent regions are selected dark areas of interest for measuring luminance; and a control module configured to run a test to characterize contrast in each of a plurality of virtual image planes of a head-up display including controlling the spatial light modulator to generate the modulated beam, measuring luminance levels of each of the plurality of versions of the same test image displayed in the plurality of virtual image planes, calculating a plurality of contrast ratios based on the luminance levels of each of the plurality of versions of the same test image, determining whether the plurality of contrast ratios are within predetermined ranges of predetermined contrast ratios, and adjusting operation of the spatial light modulator in response to at least one of the plurality of contrast ratios not being within a corresponding one of the predetermined ranges.

2. The holographic projection system of claim 1, wherein the plurality of versions of the same test image comprises:

a first version of the test image displayed in a first virtual image plane; and a second version of the test image displayed in a second virtual image plane located closer to the eyebox than the first virtual image plane.

3. The holographic projection system of claim 1, wherein the plurality of bright objects are not black in color.

4. The holographic projection system of claim 1, wherein:

the plurality of bright objects comprise a first bright object; and the plurality of transparent regions are located around the first bright object.

5. The holographic projection system of claim 1, wherein:

the plurality of bright objects comprise a first bright obje the plurality of transparent regions comprise a first transparent region and a second transparent region;

the first transparent region is located above the first bright object;

the second transparent region is located below the first bright object.

6. The holographic projection system of claim 1, wherein measuring the luminance levels of the plurality of versions of the same test image and calculating the plurality of contrast ratios comprise:

measuring luminance levels of a first version of the test image displayed in a first virtual image plane including luminance levels of bright objects in the first version of the test image and luminance levels of selected transparent regions of the first version of the test image;

calculating a first contrast ratio based on the luminance levels of the first version of the test image;

measuring luminance levels of a second version of the test image displayed in a second virtual image plane including luminance levels of bright objects in the second version of the test image and luminance levels of selected transparent regions of the second version of the test image; and calculating a second contrast ratio based on the luminance levels of the second version of the test image.

7. The holographic projection system of claim 6, wherein:

the first contrast ratio is determined based on (i) a sum of luminance levels of bright objects displayed in the first version of the test image, (ii) a sum of luminance level of selected transparent regions of the first version of the test image, (iii) a number of the bright objects displayed in the first version of the test image, and (iv) a number of the selected transparent regions of the first version of the test image; and the second contrast ratio is determined based on (i) a sum of luminance levels of bright objects displayed in the second version of the test image, (ii) a sum of luminance level of selected transparent regions of the second version of the test image, (iii) a number of the bright objects displayed in the second version of the test image, and (iv) a number of the selected transparent regions of the second version of the test image.

8. The holographic projection system of claim 1, wherein the control module is configured to, while adjusting the operation of the spatial light modulator, adjust phase modulation of the spatial light modulator to be less than or equal to one wavelength of the modulated beam and within a predetermined range of one wavelength of the modulated beam.

9. The holographic projection system of claim 1, wherein the control module is configured to, while adjusting the operation of the spatial light modulator, calibrating the spatial light modulator to lower intensity levels of a conjugate image displayed in one of the plurality of virtual image planes.

10. The holographic projection system of claim 1, wherein the control module is configured to at least one of identify or select locations of the plurality of transparent regions relative to locations of bright objects displayed in the test image.

11. A vehicle system comprising:

the holographic projection system of claim 1; and a window of a vehicle, wherein the holographic projection system is configured to reflect the plurality of versions of the same test image off the window to be viewable at the eyebox.

12. The holographic projection system of claim 1, wherein the control module is configured to calibrate the spatial light modulator including adjusting the operation of the spatial light modulator in response to at least one of the plurality of contrast ratios not being within a corresponding one of the predetermined ranges to at least one of capture, minimize and eliminate artifacts.

13. A method of testing and correcting operation of a holographic projection system, the method comprising:

generating a light beam via a light source;

receiving the light beam at a spatial light modulator and generating a modulated beam projected at an eyebox, wherein the modulated beam comprises a plurality of versions of a same test image, wherein the test image comprises a plurality of bright objects and a plurality of transparent regions, and wherein the plurality of transparent regions are selected dark areas of interest for measuring luminance; and running a test to characterize contrast in each of a plurality of virtual image planes of a head-up display including controlling the spatial light modulator to generate the modulated beam, measuring luminance levels of each of the plurality of versions of the same test image displayed in the plurality of virtual image planes, calculating a plurality of contrast ratios based on the luminance levels of each of the plurality of versions of the same test image, determining whether the plurality of contrast ratios are within predetermined ranges of predetermined contrast ratios, and adjusting operation of the spatial light modulator in response to at least one of the plurality of contrast ratios not being within a corresponding one of the predetermined ranges.

14. The method of claim 13, wherein the plurality of versions of the same test image comprises:
    a first version of the test image displayed in a first virtual image plane; and
    a second version of the test image displayed in a second virtual image plane located closer to the eyebox than the first virtual image plane.

15. The method of claim 13, wherein a number of the plurality of transparent regions is different than a number of the plurality of bright objects.

16. The method of claim 13, wherein:
    the plurality of bright objects comprise a first bright object; and
    the plurality of transparent regions are located around the first bright object.

17. The method of claim 13, wherein:
    the plurality of bright objects comprise a first bright object;
    the plurality of transparent regions comprise a first transparent regions and a second transparent regions;
    the first transparent region is displayed above the first bright object; and
    the second transparent region is displayed below the first bright object.

18. The method of claim 13, further comprising:
    determining a first contrast ratio based on (i) a sum of luminance levels of bright objects displayed in a first version of the test image, (ii) a sum of luminance levels of transparent regions of the first version of the test image (iii) a number of the bright objects displayed in the first version of the test image, and (iv) a number of the transparent regions of the first version of the test image; and
    determining a second contrast ratio based on (i) a sum of luminance levels of bright objects displayed in a second version of the test image, (ii) a sum of luminance levels of transparent regions of the second version of the test image, (iii) a number of the bright objects displayed in the second version of the test image, and (iv) a number of the transparent regions of the second version of the test image,
    wherein measuring the luminance levels of the plurality of versions of the same test image and calculating the plurality of contrast ratios comprise;
    measuring luminance levels of the first version of the test image displayed in a first virtual image plane;
    calculating the first contrast ratio based on the luminance levels of the first version of the test image;
    measuring luminance levels of the second version of the test image displayed in a second virtual image plane; and
    calculating the second contrast ratio based on the luminance levels of the second version of the test image.

19. The method of claim 13, further comprising, while adjusting the operation of the spatial light modulator, adjusting phase modulation of the spatial fight modulator to be less than or equal to one wavelength of the modulated beam and within a predetermined range of one wavelength of the modulated beam.

20. The method of claim 13, further comprising, while adjusting the operation of the spatial light modulator, calibrating the spatial light modulator to lower intensity levels of a conjugate image displayed in one of the plurality of virtual image planes.

* * * * *